(12) United States Patent
Maki et al.

(10) Patent No.: US 8,307,178 B2
(45) Date of Patent: Nov. 6, 2012

(54) STORAGE SYSTEM, REMOTE COPY AND MANAGEMENT METHOD THEREFOR

(75) Inventors: Nobuhiro Maki, Yokohama (JP); Yuri Hiraiwa, Sagamihara (JP); Yoshiyuki Nishi, Fujisawa (JP); Katsuhisa Miyata, Yokohama (JP); Akira Deguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/209,578

(22) Filed: Aug. 15, 2011

(65) Prior Publication Data

US 2011/0302382 A1 Dec. 8, 2011

Related U.S. Application Data

(63) Continuation of application No. 12/706,133, filed on Feb. 16, 2010, now Pat. No. 8,024,537, which is a continuation of application No. 11/491,363, filed on Jul. 24, 2006, now Pat. No. 7,689,790.

(30) Foreign Application Priority Data

Apr. 26, 2006 (JP) ................................. 2006-121539

(51) Int. Cl.
*G06F 12/16* (2006.01)
(52) U.S. Cl. ........................ 711/162; 711/161
(58) Field of Classification Search .................. None
See application file for complete search history.

(56) References Cited

U.S. PATENT DOCUMENTS

| | | | |
|---|---|---|---|
| 5,572,659 A | 11/1996 | Iwasa et al. | |
| 5,890,217 A | 3/1999 | Kabemoto et al. | |
| 5,937,414 A | 8/1999 | Souder et al. | |
| 6,353,878 B1 | 3/2002 | Dunham | |
| 6,408,370 B2 | 6/2002 | Yamamoto et al. | |
| 6,529,944 B1 | 3/2003 | LeCrone | |
| 6,950,915 B2 | 9/2005 | Ohno et al. | |
| 7,266,718 B2 | 9/2007 | Idei et al. | |
| 7,441,145 B2 | 10/2008 | Hiraiwa et al. | |
| 7,689,790 B2 | 3/2010 | Maki et al. | |
| 2002/0053008 A1 | 5/2002 | Goodman et al. | |
| 2003/0126388 A1* | 7/2003 | Yamagami | 711/162 |
| 2004/0153616 A1* | 8/2004 | Nakamura et al. | 711/162 |
| 2004/0172509 A1 | 9/2004 | Takeda et al. | |
| 2004/0243892 A1 | 12/2004 | McBride et al. | |
| 2005/0210078 A1* | 9/2005 | Maruyama et al. | 707/202 |

(Continued)

FOREIGN PATENT DOCUMENTS

JP    1185408    3/1999

(Continued)

*Primary Examiner* — Than Nguyen
(74) *Attorney, Agent, or Firm* — Brundidge & Stanger, P.C.

(57) ABSTRACT

A copy source storage controller received write data added with a time and issued from a host computer transfers the write data with the time to a copy destination storage controller. If there are a plurality of copy destination storage controllers, a representative copy destination storage controller compares times of write data copied to the plurality of copy destination storage controllers, and writes the write data in copy destination logical volumes in the sequential order of time. The representative copy destination storage controller judges that integrity of the write data is established, if a communication procedure is established with the copy destination storage controller and if the statuses of the copy source/destination logical volumes are coincident. In remote copy which guarantees integrity of write data and traverses a plurality of storage controllers, it is possible to judge at an optional time point whether integrity of write data can be guaranteed.

10 Claims, 13 Drawing Sheets

U.S. PATENT DOCUMENTS

| | | | |
|---|---|---|---|
| 2005/0240634 A1* | 10/2005 | Iwamura et al. | 707/200 |
| 2006/0048014 A1 | 3/2006 | Takahashi et al. | |
| 2006/0085575 A1* | 4/2006 | Hosouchi et al. | 710/38 |
| 2006/0161721 A1* | 7/2006 | Iwamura et al. | 711/100 |
| 2006/0195667 A1 | 8/2006 | Nakano et al. | |
| 2007/0033355 A1 | 2/2007 | Maki et al. | |
| 2007/0113034 A1 | 5/2007 | Maruyama et al. | |
| 2007/0118705 A1 | 5/2007 | Arakawa et al. | |
| 2007/0255914 A1 | 11/2007 | Maki et al. | |
| 2010/0146232 A1 | 6/2010 | Maki et al. | |
| 2011/0083033 A1 | 4/2011 | Maki et al. | |

FOREIGN PATENT DOCUMENTS

| | | |
|---|---|---|
| JP | 2003122509 | 4/2003 |
| JP | 2005196618 | 7/2005 |
| JP | 2005242403 | 9/2005 |
| JP | 2006048578 | 2/2006 |
| JP | 2006079568 | 3/2006 |

* cited by examiner

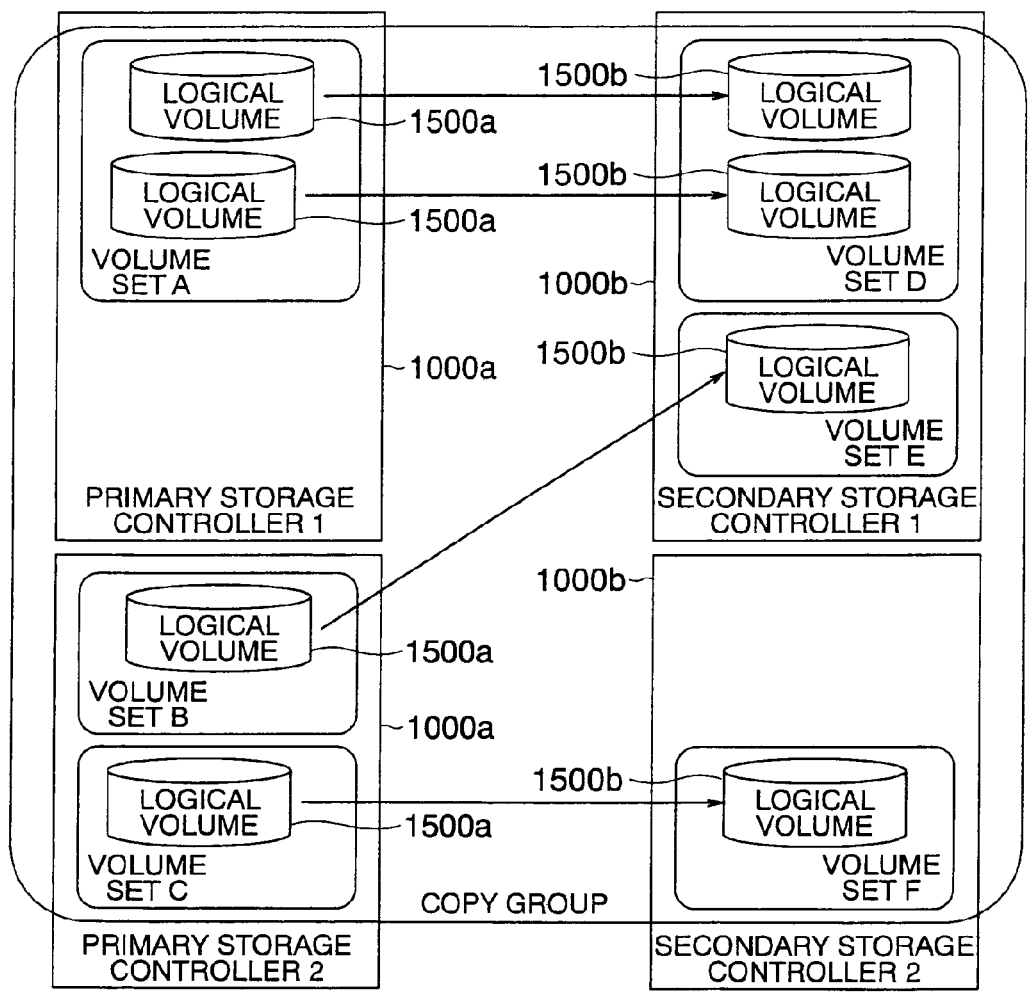

FIG. 4
VOLUME SET MANAGEMENT INFORMATION

| | |
|---|---|
| VOLUME SET ID | 2A |
| COPY VOLUME ID | 2B |
| WRITE TIME | 2C |
| LOGICAL VOLUME NUMBER | 2D |
| LOGICAL VOLUME ID | 2E |
| ⋮ | |
| LOGICAL VOLUME ID | 2E |
| PARTNER STORAGE CONTROLLER ID | 2F |
| PARTNER VOLUME SET ID | 2G |
| LATEST DATA REFLECTION TIME | 2H |

(1210)

FIG. 5
WRITE DATA MANAGEMENT INFORMATION

| | |
|---|---|
| LOGICAL VOLUME ID | 3A |
| WRITE ADDRESS | 3B |
| WRITE DATA LENGTH | 3C |
| WRITE DATA POINTER | 3D |
| SEQUENTIAL NUMBER | 3E |
| WRITE TIME | 3F |
| TRANSFER NECESSARY BIT | 3G |

(1220)

FIG. 6
COPY PAIR MANAGEMENT INFORMATION

| PRIMARY LOGICAL VOLUME ID | COPY STATUS | SECONDARY STORAGE CONTROLLER ID | SECONDARY LOGICAL VOLUME ID | PRIMARY VOLUME SET ID | PRIMARY COPY GROUP ID |
|---|---|---|---|---|---|
| 5A | 5B | 5C | 5D | 5F | 5G |

(1230)

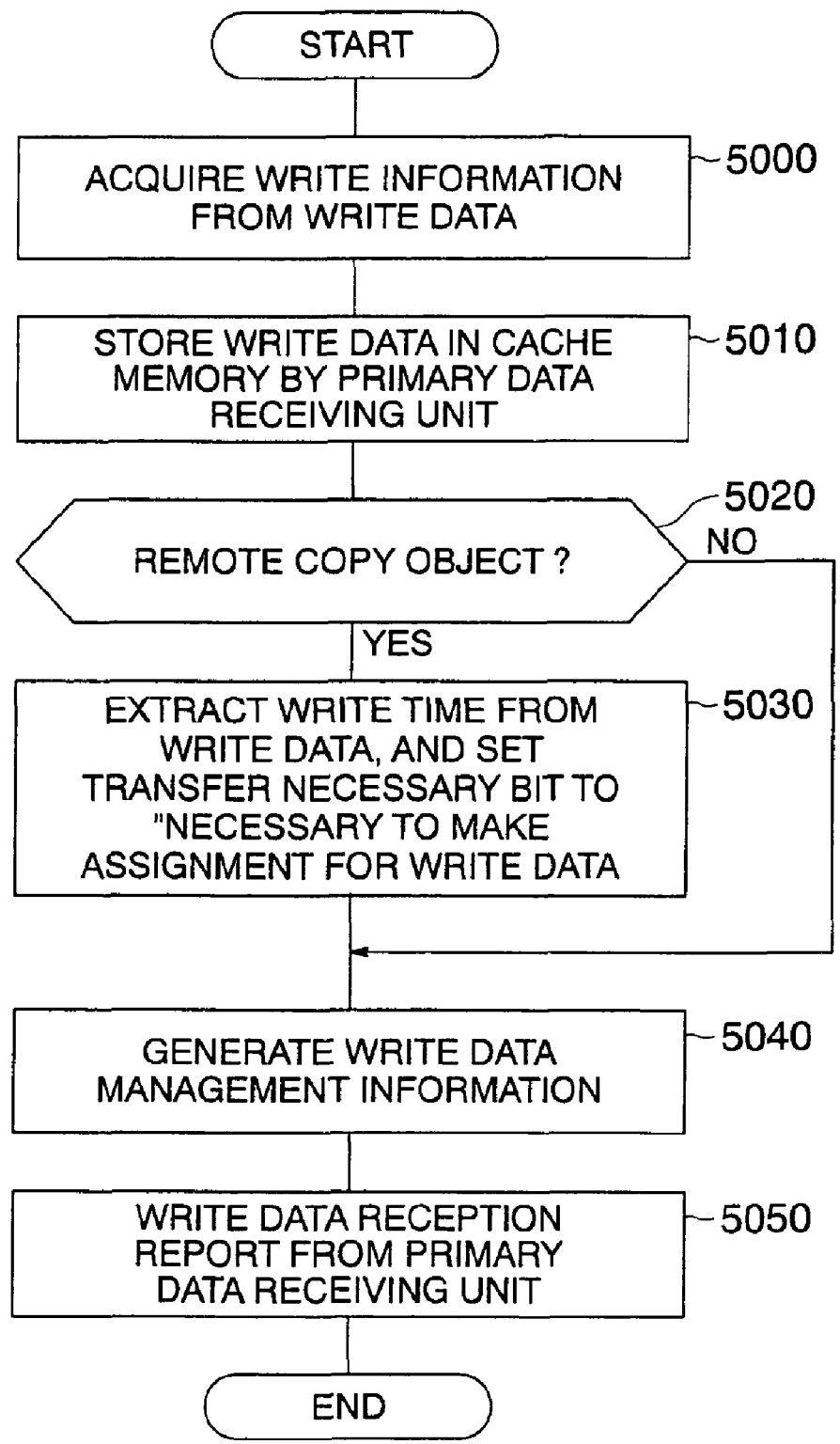

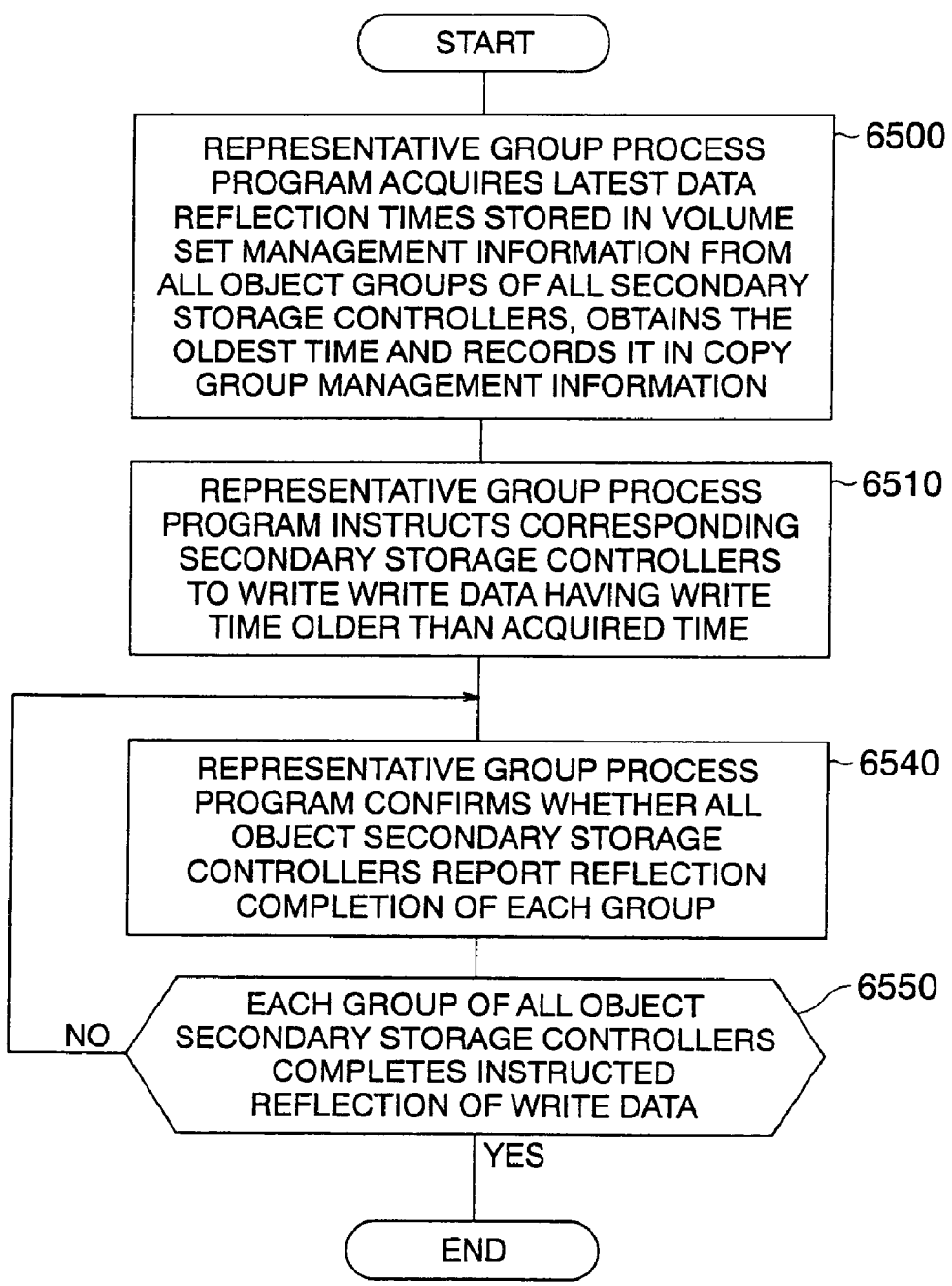

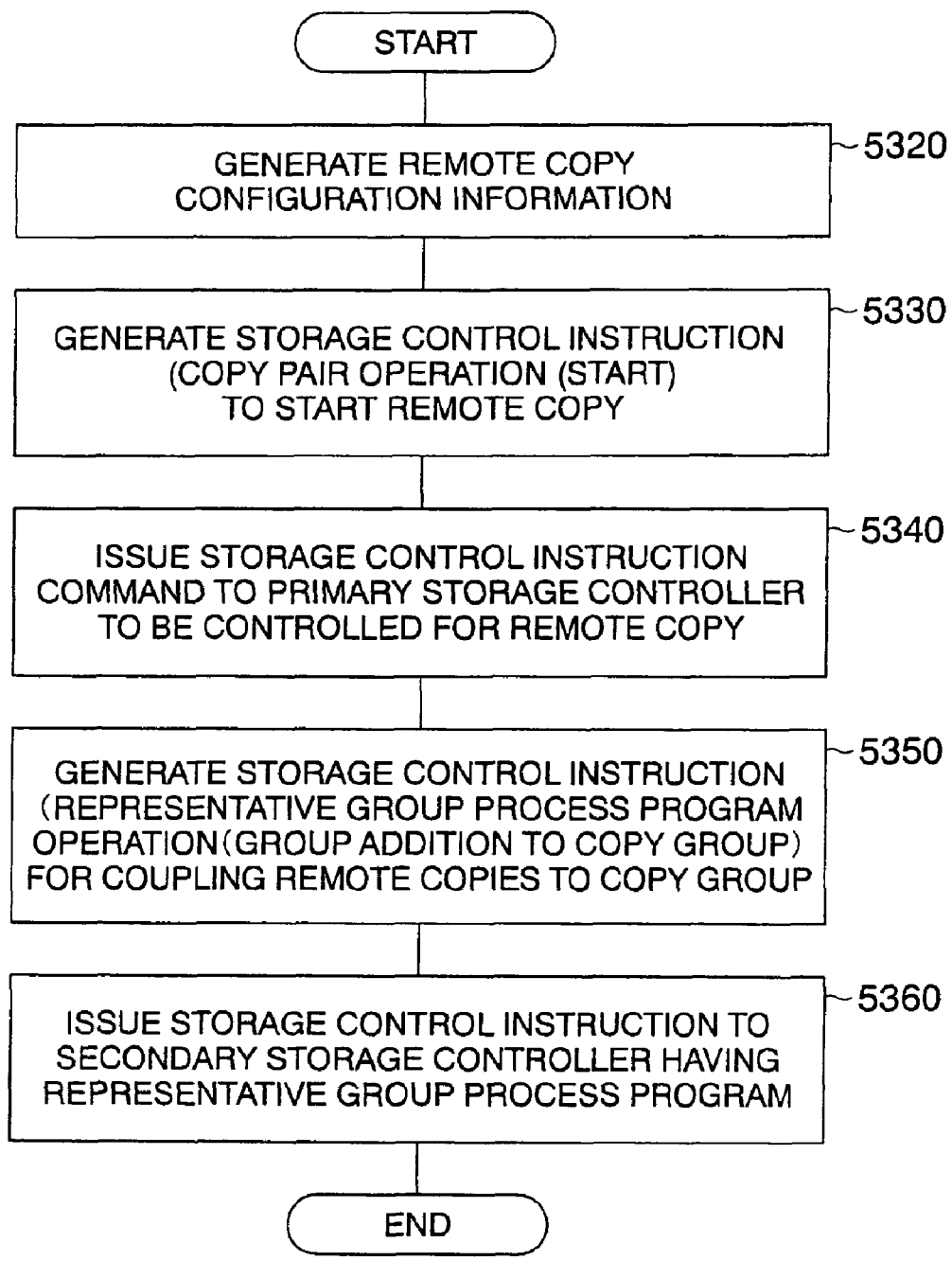

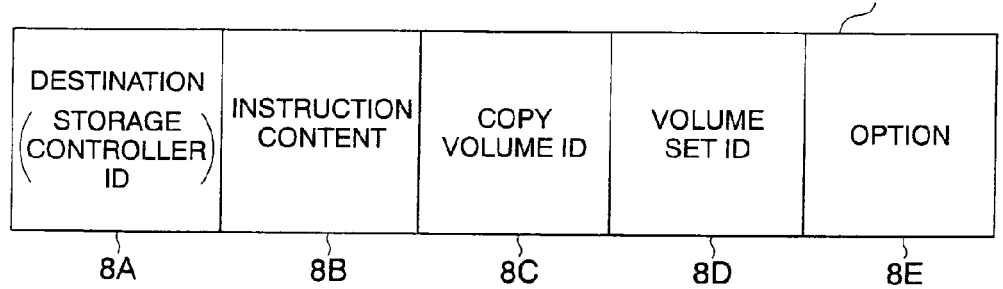

STORAGE SYSTEM, REMOTE COPY AND MANAGEMENT METHOD THEREFOR

CROSS REFERENCE TO RELATED APPLICATIONS

The present application is a continuation of application Ser. No. 12/706,133, filed Feb. 16, 2010, now U.S. Pat. No. 8,024,537; which is a continuation of application Ser. No. 11/491,363, filed Jul. 24, 2006, now U.S. Pat. No. 7,689,790; which claims priority from Japanese application JP 2006-121539 filed on Apr. 26, 2006 and which relates to an application Ser. No. 11/234,195, filed Sep. 26, 2005, by Nobuhiro MAKI et al., the content of which is hereby incorporated by reference into this application.

BACKGROUND OF THE INVENTION

1. Field of the Invention

The technique disclosed in this specification relates to a storage controller and its control method, and more particularly to a storage system in a remote copy environment in a computer system having a plurality of storage controllers.

2. Description of the Related Art

As the amount of data has increased explosively, the number of host computers within a computer system and the capacities of storage systems tend to increase.

Additionally, as businesses depend more on information processing systems and the amount of damage caused by lost of data increases to an enormous level, the importance of disaster recovery of the data increase more and more.

A typical fabrication example of disaster recovery is a remote copy configuration. For example, JP-A-HEI-11-85408 discloses the techniques by which data issued by a host computer is received by a storage system, the storage system writes the data therein, and transfers the data to a different storage system installed at a physically remote location to make it store the data.

SUMMARY OF THE INVENTION

In a storage system having a plurality of primary storage systems and secondary storage systems, pairs of logical volumes of the primary and secondary storage systems are formed and a copy starts by using a plurality of pairs as one group. There is the case wherein data transfer statuses of the pairs are different or it is necessary to confirm whether or not communication between secondary storage systems is possible. It is therefore necessary to start a copy after integrity is ensured among a plurality of pairs in order to guarantee a write sequence of data among a plurality of storage systems.

In order to solve any one of the above-described issues, for example, a computer system comprises: a storage system A of copy source connected to the host computer and having a first logical volume for storing data received from the host computer; a storage system B of copy source connected to the host computer and having a second logical volume; a storage system C of copy destination connected to the storage system A and having a third logical volume for storing a replication of data stored in the first logical volume; and a storage system D of copy destination connected to the storage system B and having a fourth logical volume for storing a replication of data stored in the second logical volume.

The storage system A receives write data added with time information and issued from the host computer, transmits the write data and time information to the storage system C. Similarly, the storage system B receives write data and time information issued from the host computer, transmits the write data and time information to the storage system D. In this case, the storage system D as a representative has means for comparing the time information of the write data received from the storage system A with the time information of the write data received from the storage system B, to make the write data be stored in the third and fourth logical volumes in accordance with the time information.

The storage systems A and B have means for supplying the host computer with the status of the above-described data replication process.

The storage system D has also means for executing a communication relation configuration process relative to the storage system C for replication initialization after the replication process of the write data starts, and supplying the host computer with the process progress.

The host computer is provided with a method of judging that the write process of data at a copy destination storage system is executed normally if both the progress of the replication process of data and the replication initialization between the storage systems D and C are completed.

For the remote copy capable of maintaining the write sequence of write data among a plurality of storage systems, it is possible to judge at an optional time point that data write is performed correctly and to guarantee that the write sequence of data is maintained for the remote copy.

BRIEF DESCRIPTION OF THE DRAWINGS

FIG. 2 is a conceptual diagram illustrating a group and a copy group of remote copy executed traversing a plurality of object storage controllers of the embodiment.

FIG. 3 is a diagram showing the format of copy group management information stored in the storage controller according to the embodiment.

FIG. 4 is a diagram showing the format of volume set management information stored in the storage controller according to the embodiment.

FIG. 5 is a diagram showing the format of write data management information stored in the storage controller according to the embodiment.

FIG. 6 is a diagram showing the format of copy pair management information stored in the storage controller according to the embodiment.

FIG. 9 is a flow chart illustrating an example of a process to be executed when the storage controller receives a write I/O request for a logical volume according to the embodiment.

FIG. 12 is a flow chart illustrating an example of a write data reflection process for a copy destination logical volume to be executed by the secondary storage controller having a representative group process program.

FIG. 13 is a flow chart illustrating an example of a copy start operation by the host computer using a copy group according to the embodiment.

FIG. 15 is a diagram showing an example of a storage control instruction to be executed when the host computer controls the storage controller according to the embodiment.

FIG. 16 s a diagram showing an example of remote copy configuration information to be used by storage management software running on the host computer according to the embodiment.

DESCRIPTION OF THE EMBODIMENT

An embodiment of the present invention will be described. The present invention is not limited to the embodiment described below.

Figure 1:
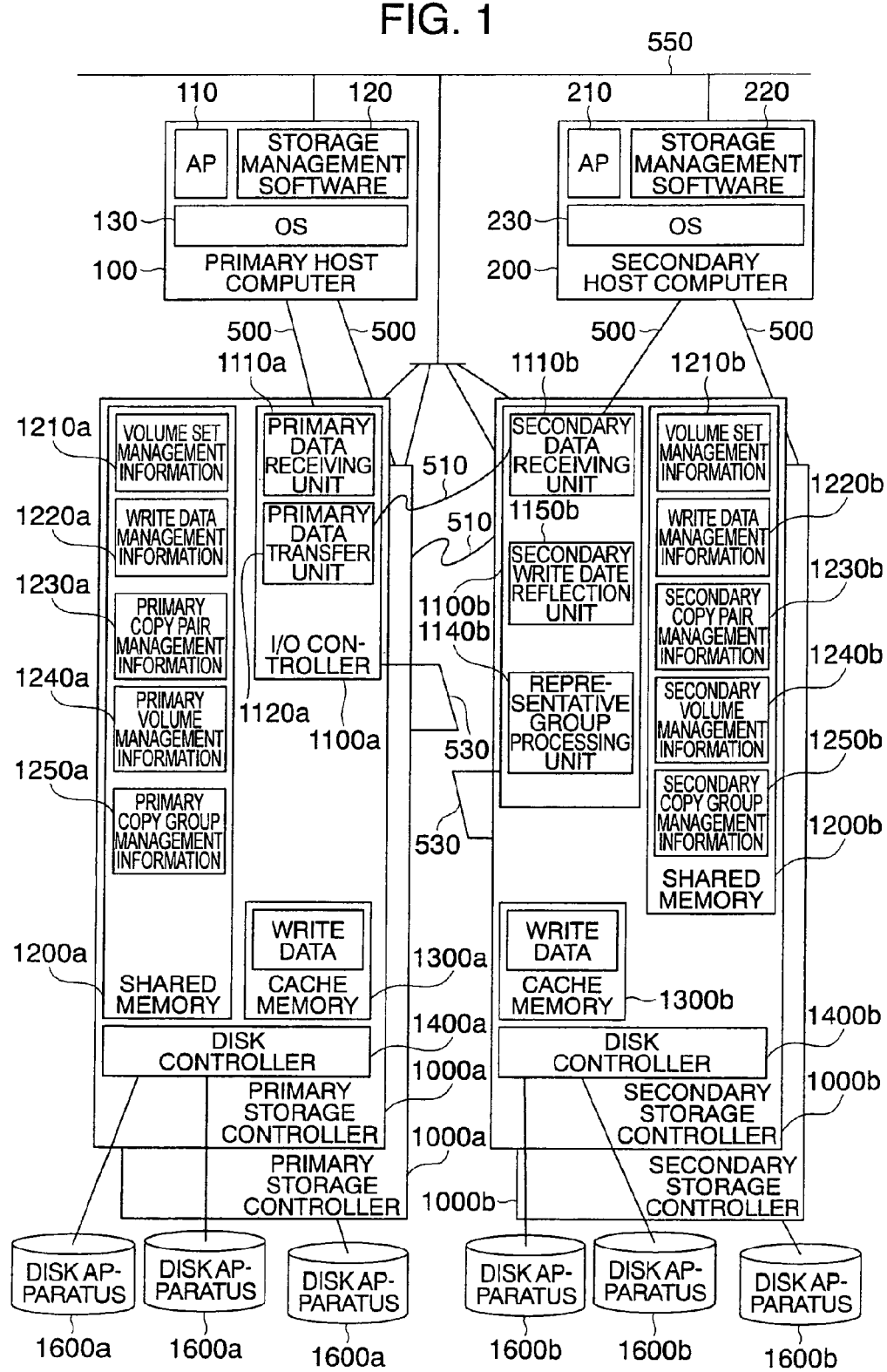
FIG. 1 is a block diagram showing the configuration of a computer system according to an embodiment of the present invention.

FIG. 1 is a diagram showing an example of the configuration of a computer system according to he embodiment. The computer system has one or more primary host computers 100, a plurality of primary storage controllers 1000a, one or more secondary host computers 200 and a plurality of secondary storage controllers 1000b.

A plurality of primary storage controllers 1000a and the primary host computer 100 are interconnected by communication links 500. Similarly, a plurality of secondary primary storage controllers 1000b and the secondary host computer 200 are interconnected by communication links 500. The secondary host computer 200 is used as a substitute for the primary host computer in disaster or during maintenance, and also used for performing businesses different from those of the primary host computer. The primary host computer 100 and secondary host computer 200 may be connected to a control network 550.

The primary host computer 100 and secondary host computer 200 are computers each having a processor, a memory and an I/O processing unit interconnected by an internal network although these are not shown. The memory of the primary host computer 100 stores an operating system (OS) 130, an application program (hereinafter called AP) 110 such as a database and storage management software 120. These are executed by the processor of the primary host computer 100. The memory of the secondary host computer 200 stores an operating system (OS) 230, storage management software 220 and an AP 210. These are executed by the processor of the secondary host computer 200.

An I/O request issued from the primary host computer 100 and secondary host computer 200 by using AP and storage management software with involvement of OS is received via the communication paths 500 by the primary storage controller 1000a and secondary storage controller 1000b and processed therein.

Each primary storage controller 1000a has an I/O controller 1100a, a shared memory 1200a, a cache 1300a, a disk controller 1400a, and one or more disk controllers 1600a which are internally connected by a network. The I/O controller 1100a can execute various programs for a primary data reception unit 1110a and a primary write data transfer unit 1120a. The I/O controller 1100a of one of the primary storage controllers 1000a executes various programs and controls external transmission/reception via a communication link.

Information necessary for processes to be executed by the input/output control unit includes volume set management information 1210a, write data management information 1220a, primary copy pair management information 1230a, primary volume management information 1240a and primary copy group management information 1250a. These pieces of information are stored in the shared memory 1200a.

The cache 1300a is a high speed memory for storing mainly read data and write data. By using the cache 1300a, a high I/O processing performance can be realized.

The disk control unit 1400a executes a process of supplying one or more disk apparatus 1600a as a logical storage resource (hereinafter called a logical volume). The disk control unit 1400a also executes, when necessary, a transfer process of read data and write date between the cache 1300a and disk apparatus 1600a.

The disk apparatus 1600a is a large capacity physical data storage apparatus such as a hard disk drive and a flash memory. The disk apparatus 1600a executes a data read/write process in accordance with an input/output command from the disk control unit.

Each secondary storage controller 1000b has also an I/O controller 1100b, a shared memory 1200b, a cache 1300b, a disk controller 1400b, and one or more disk controllers 1600b which are internally connected by a network. The I/O controller 1100b executes various programs for a secondary data reception unit 1110b and a secondary write data reflection unit 1150b. The I/O controller 1100b of one of the secondary primary storage controllers 1000b executes a representative group process program 1140b which is stored in the shared memory 1200b. The representative group process program is read from the shared memory and executed by the I/O controller 1100b.

The shared memory 1200b stores volume set management information 1210b, write data management information 1220b, secondary copy pair management information 1230b, secondary volume management information 1240b and copy group management information 1250b, respectively used by the I/O controller 1100b.

The functions of the cache memory 1300b, disk controller 1400b and disk apparatus 1600b are the same as those of the primary storage controller 1000a.

The primary storage controllers 1000a and secondary storage controllers 1000b are interconnected by communication links 510. Connection is established via communication links 530 among the primary storage controllers 1000a and among the secondary storage controllers 1000b. A system having the primary storage controller 1000a and disk apparatus 1600a is called a primary storage system, and a system having the secondary storage controller 1000*b* and disk apparatus 1600*b* is called a secondary storage system.

Figure 17:
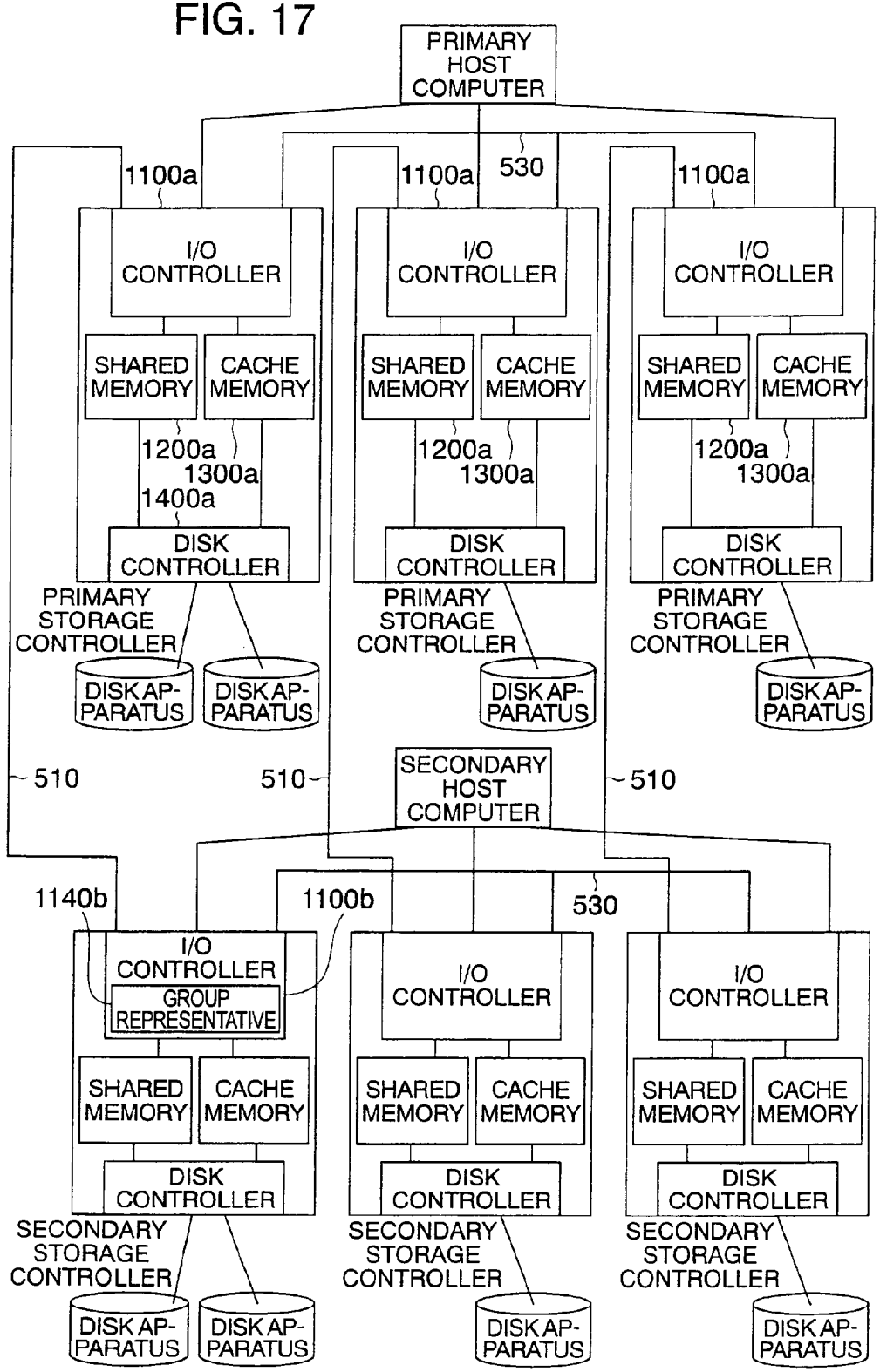
FIG. 17 is a diagram showing an example of the hardware system configuration illustrating the relation among a plurality of storage controllers according to the embodiment.

FIG. 17 shows a hardware configuration of the embodiment. The primary storage controllers 1000*a* are interconnected by the communication links 530.

Similarly, the secondary storage controllers 1000*b* are interconnected by the communication links 530. The primary/secondary storage controllers 1000*a/b* each have the I/O controller 1100*a/b*, shared memory 1200*a/b*, cache 1300*a/b*, disk controller 1400*a/b*, and one or more disk apparatus 1600*a/b* which are internally connected by networks.

The representative group process program 1140*b* is stored in one of the secondary storage controllers 1000*b*. One representative group process program 1140*b* is provided for each remote copy using a copy group.

Next, description will be made on the outline of a remote copy operation to be performed among the primary/secondary storage controllers. Consider for example that the primary host computer 100 issues a write I/O request to the primary storage controller 1000*a*. It is assumed that the primary host computer 100 can add a time (hereinafter called a write time) set in the computer to the write I/O request. As the write I/O request issued by the primary host computer 100 arrives at the primary storage controller 1000*a*, the write data contained in the I/O request is stored in a logical volume of the primary storage controller 1000*a*.

If the I/O request indicates data write to a logical volume registered beforehand as a remote copy, the primary storage controller 1000*a* executes a remote copy of the write data. The remote copy means a procedure of remotely copying write data in a particular logical volume of the primary storage controller 1000*a* to a particular logical volume of the secondary storage controller 1000*b*. A combination of a copy source volume of a remote copy and a copy destination volume of write data is called a copy pair.

In this embodiment, a plurality of copy pairs exist between the primary storage controller 1000*a* and secondary storage controller 1000*b*, and specific copy pairs are collected as a group. FIG. 2 is a conceptual diagram illustrating an example of grouped remote copies. In FIG. 2, volume sets A, B and C exist in the primary storage controller 1000*a*, and volume sets D, E and F exist in the secondary storage controller 1000*b*. Arrows between the volumes 1500*a/b* indicate a relation of copy pairs in a group. Namely, there is a copy pair relation between the copy source volume set A and copy destination volume set D, and similarly there are copy pair relations between the volume set B and volume set E and between the volume set C and volume set F. In this embodiment, the sequence of write data received by the primary storage controller 1000*a*, transfer of write data from the primary storage controller 1000*a* to secondary storage controller 1000*b*, and reflection of write data in the secondary storage controller 1000*b* upon a logical volume are all managed in the unit of group, and resources necessary for this process are assigned.

Remote copy can be controlled in the unit of volume set, so that it is not necessary to control remote copy in the unit of a number of copy pairs and the remote copy control becomes easy. Since only copy pairs for businesses, user requests or the like can be collected as a volume set, remote copy for unnecessary logical volumes 1500 can be avoided. The requested performance of the logical volume changes with a difference between performances of the primary host computers 100 and between I/O processing performances. The grouping aims at relaxing this point by using different volume sets to perform remote copy, so that a user operation for remote copy, tuning condition setting and the like can be conducted separately at different volume sets.

The storage controller of the embodiment can further perform remote copy control by collecting a plurality of volumes or a plurality of volume sets and using a copy group. By using a copy group, remote copy control traversing a plurality of storage controllers becomes possible instead of a group range which limits a remote copy control range to logical volumes only in a storage controller. For example, in FIG. 2 a copy group includes the copy source volume sets A, B and C and the copy destination volume sets D, E and F. By using the copy group, it becomes possible to perform a remote copy from the copy source to copy destination by collecting a plurality of groups. An example of using a copy group is a distributed database which processes data over a plurality of storage controllers in order to improve the I/O processing performance.

Furthermore, the remote copy of the embodiment guarantees in the group or copy group the sequence of write data to logical volumes belonging to the group of the primary storage controller 1000*a*, also for the secondary storage controller 1000*b*. Guaranteeing the sequence of write data by the remote copy is called integrity of write data. By using the group, the remote copy is realized which can guarantee the sequence of write data in logical volumes belonging to the group in the storage controller. By using the copy group, the remote copy is realized which can guarantee the sequence of write data in logical volumes traversing the storage controllers 1000 in the copy group.

By guaranteeing the integrity of write data in the group, recovery of the secondary storage controller becomes possible by using the group for a database which processes data over a plurality of logical volumes of the storage controller, or by using the copy group for a database which processes data over a plurality of storage controllers. Since the sequence of write data received at the primary storage controller is guaranteed also for the secondary storage controller, a recovery procedure of the secondary storage controller is the same as that of the primary storage controller in failure. If the copy group is not used, even if write data issued from the primary host computer to one primary storage controller 1000*a* cannot be transferred to a copy destination secondary storage controller because of a communication link trouble or the like, write data received at another primary storage controller can be transferred to the secondary storage controller 1000*b* unless a trouble occurs at the communication link of the other primary storage controller 1000*a*. If the primary storage controller 1000*a* undergoes a trouble, data requiring an application program may not be transferred correctly and the business cannot be recovered even if the recovery process of the secondary host computer is performed, because the data write sequence differs from the sequence issued by the primary storage controller, relative to the secondary storage controllers 1000*b*.

FIG. 4 shows an example of the format of the volume set management information. The volume set management information 1210*a* includes a volume set ID (2A), a copy group ID (2B), a write time (2C), a logical volume number (2D), logical volume IDs (2E), a partner storage controller ID (2F), a partner volume set ID (2G), and a latest data reflection time (2H). The volume set ID (2A) is used for identifying a group in the primary storage controller 1000*a*. The copy group ID (2B) is an ID for identifying a copy group. The write time (2C) stores a time of write data issued by the host computer. The logical volume number (2D) represents a total number of logical volumes 1500 existing in the group. The volume ID (2E) is an ID of a volume existing in the group, the volume IDs existing as many as the logical volume number (2D). The partner storage controller ID (2F) is an ID of the secondary storage controller 1000*b* which is a copy destination of remote copy by the primary storage controller 1000*a*. The partner volume set ID (2G) is an ID for identifying a group to which the copy destination logical volume of the secondary storage controller identified by the partner storage controller ID belongs. The latest data reflection time (2H) indicates a time of write data lastly written in the logical volume in the group of the secondary storage controller.

The secondary storage controller 1000*b* has also the volume set management information 1210*b*. The items of the volume set management information 1210*b* are similar to the volume set management information 1210*a* of the primary storage controller 1000*a*. However, the volume set ID of the volume set management information 1210*b* is an ID for identifying the group to which the copy destination logical volume 1500 belongs, the partner storage controller ID is an ID for identifying the primary storage controller 1000*a* having the copy source logical volume, and the partner volume set ID is an ID for identifying the group to which the copy source logical volume of the primary storage controller 1000*a* identified by the partner storage controller ID belongs.

FIG. 5 shows an example of the format of the write data management information 1220*a*. The write data management information includes information to be referred when a replication of data to be stored in the copy source logical volume is stored in the copy destination logical volume of the secondary storage controller. The write data management information 1220*a* includes a logical volume ID (3A), a write address (3B), a write data length (3C) a write data pointer (3D), a sequential number (3E), a write time (3F), and a transfer necessary bit (3G). The logical volume ID (3A) is an ID for identifying a write destination volume of the write data. The write address (3B) is a write address in the write destination volume for the write data. The write data length (3C) is a data size of the write data. The transfer necessary bit (3G) indicates whether there is a remote copy object.

The contents of the write data management information 1220*b* of the secondary storage controller 1000*b* are similar to those of the write data management information of the primary storage controller. However, in the write data management information 1220*b* stored in the shared memory 1200 of the secondary storage controller 1000*b*, the write data management information differs from the write data management information of the primary storage controller 1000*a* in that the logical volume ID is an ID of the copy destination volume ID, the write data pointer is a start address of write data of the cache memory 1300*b* of the secondary storage controller 1000*b*, and the transfer necessary bit indicates no transfer.

Figure 18:
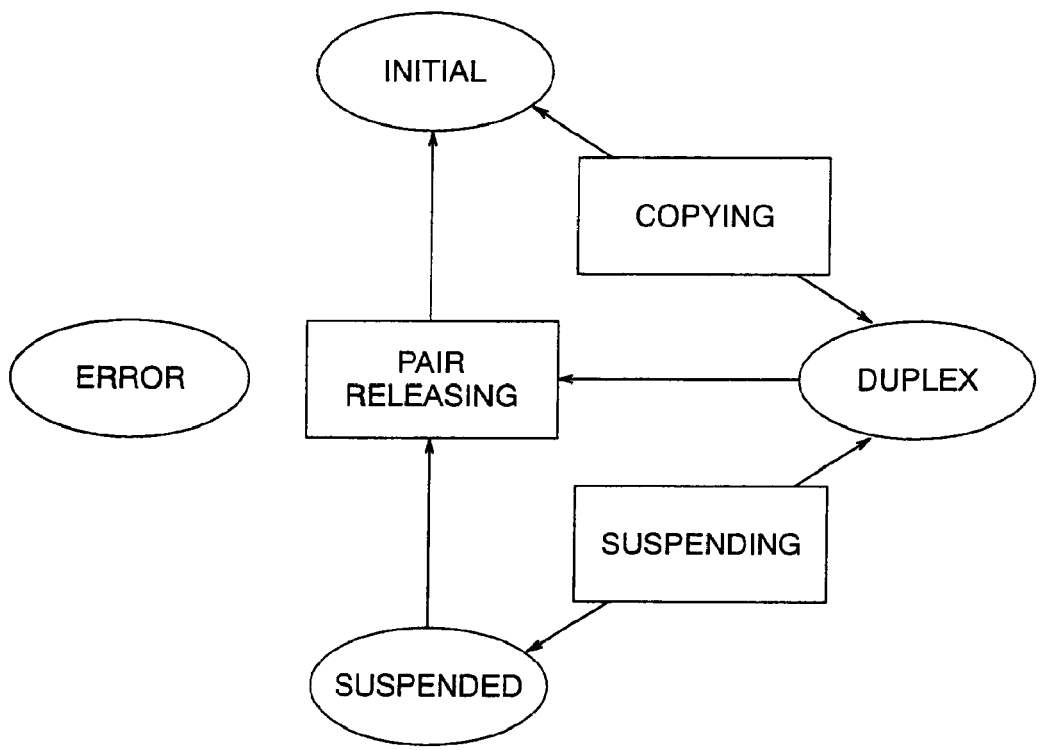
FIG. 18 is a status transition table of remote copies as objects of the embodiment.

There are seven copy pair statuses including "initial", "copying", "duplex", "suspending", "suspended" "pair releasing" and "error". The initial status is a status that a copy is not started. The copying status is a status of initial copying. The copying status indicates a transient status that the contents in a copy source logical volume of the copy pair are not transferred completely to a copy destination logical volume, and corresponds to the status to be transited immediately after the copy start and to be unable to guarantee the integrity of write data. The duplex status indicates that the contents in a copy source logical volume of the copy pair are transferred completely to a copy destination logical volume, and corresponds to the status that the logical contents are coincident. After transition to the duplex status, data transfer is executed only when write data to the volume of the primary storage controller 1000*a* is received. The suspended status is a transient status during transition to temporary copy stop. The suspending status is the status that copy is temporarily stopped. In this status, the write data is temporarily stored in the copy source primary storage controller 1000*a*. When the copy resumes, the temporarily stored write data is transferred from the primary storage controller to the secondary storage controller. The status of transition from the temporary stop status to the duplex status is also the temporary stop status. The pair releasing status is a transient status to be transited when the copy is terminated. The error status is transited when a failure occurs during a copy process. FIG. 18 shows a transition table of copy statuses. Arrows indicate transition directions. An ellipsoid indicates a steady state, and a rectangle indicates a transient state. For example, the pair releasing status indicates that this status can be transited from the suspended status and duplex status. Since the error status can be transited from any status, the transition direction is not shown.

FIG. 6 shows an example of the format of the copy pair management information 1230*a*. The copy pair management information 1230*a* includes a primary logical volume ID (5A), a copy status (5B), a secondary storage controller ID (5C), a secondary logical volume ID (5D), a volume set ID (5F), and a copy group ID (5G). The primary logical volume ID (5A) is an ID for identifying a copy source logical volume of the primary storage controller. The copy status (5B) indicates a copy process status. The secondary storage controller ID (5C) is an ID for identifying the copy destination storage controller. The secondary volume ID (5D) is an ID for identifying the copy destination logical volume of the secondary storage controller. The primary volume set ID (5F) is an ID for identifying the copy group of the primary storage controller 1000*a* to which the copy pair belongs. The copy group ID (5G) is an ID for identifying the copy group collecting primary and secondary copy groups of the primary and secondary storage controllers.

The copy pair management information 1230*a* contains copy pair information of all remote copies stored and operated in the primary storage controller 1000*a*.

Figure 7:
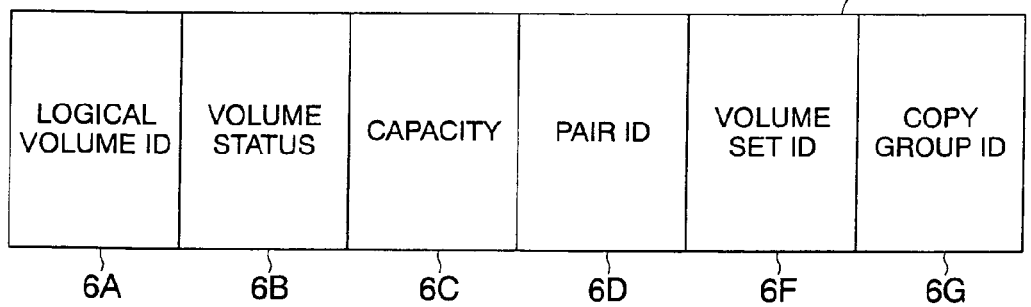
FIG. 7 is a diagram showing the format of volume management information stored in the storage controller according to the embodiment.

The secondary storage controller 1000*b* has also the copy pair management information whose terms are similar to those of the copy pair management information of the primary storage controller 1000*a*. FIG. 7 shows an example of the format of the volume management information 1240*a*. The volume management information 1240*a* is used for the primary storage controller 1000*a* to manage the statuses of all volumes of the primary storage controller. The volume management information 1420*a* includes a logical volume ID (6A), a volume status (6B), a capacity (6C), a pair ID (6D), a volume set ID (6F), and a copy group ID (6G). The logical volume ID (6A) is an ID for identifying the copy source logical volume of the primary storage controller. The volume status (6B) indicates a volume status taking a value of one of "normal", "primary", "secondary", "abnormal" and "not in use". The volume status of normal or primary means that the primary host computer 100 or secondary host computer 200 can access the logical volume normally. The volume status of primary indicates the copy source logical volume. The volume status of secondary indicates the copy destination logical volume. The volume status of abnormal means that the primary host computer 100 or secondary host computer 200 cannot access the logical volume normally. For example, this corresponds to an obstacle caused by a failure of the disk apparatus 1600*a* having the logical volume. The volume status of not in use means that the logical volume is not used. The pair ID (6D) is an ID for identifying the pair. The volume set ID (6F) is an ID for identifying the group of the primary storage controller 1000*a* in the copy group. The copy group ID (6G) is an ID for identifying the copy group.

The secondary storage controller 1000b has also the volume management information 1240b which is similar to that of the primary storage controller 1000a.

FIG. 3 shows an example of the format of the copy group management information 1250b. The copy group management information 1250b is stored in the secondary storage controller on which the representative group process program 1140b runs. The copy group management information includes a copy group ID (1A), a volume set number (1B), a container time (1C), volume set information (1D). The copy group ID (1A) is an ID for identifying the copy group among the primary and secondary storage controllers. The volume set number (1B) indicates a total number of volume sets existing in the copy group. The container time (1C) indicates a time possessed by the write data lastly written in the logical volume of the secondary storage controller in the copy group. The volume set information (1D) includes volume set information registered for the copy group. The volume set information includes a storage controller ID for identifying the secondary storage controller, an ID of the volume of the secondary storage controller, a group registration status representative of whether or not the representative group process program is registered and the like, and a group operation status indicating the operation status of the group. Pieces of the group information (1D) exist as many as the volume set number (1B).

Next, description will be made on the normal remote copy operation using the copy group.

FIG. 9 is a flow chart illustrating an operation to be performed when the primary storage controller 1000a receives from the primary host computer 100 or secondary host computer 200 a write I/O request relative to the logical volume 1500a which is a copy source of the remote copy.

The primary data receiving unit 1110a of the primary storage controller 1000a receives via the communication ling 500 a write I/O request issued by the primary host computer. The primary data receiving unit 1110a analyzes the received write I/O request and acquires a logical volume ID of the write destination, a write address, a write data length, a write time and write data (Step 5000).

The primary data receiving unit 1110a stores the acquired write data in the cache memory 1300a (Step 5010). The primary data receiving unit 1110a refers to the volume management information 1240a stored in the shared memory 1200.

Next, the primary data receiving unit 1110a checks the management information whose primary logical volume ID (5A) coincides with the write destination logical volume ID in the received write I/O request. If this check indicates that there is an effective pair in the items of the logical volume information corresponding to the volume management information, it is judged that the write I/O request is a remote copy object (YES at Step 5020).

If the received write I/O request is a remote copy object, the primary data receiving unit 1230a extracts the write time from the write data, and sets the transfer necessary bit to "necessary" to make assignment for the write data (Step 5030). The extracted write time is used to guarantee the write sequence of remote copy, in the group or copy group, to the copy destination logical volume.

After Step 5030 or if there does not exist a pair ID in the volume management information in the received write I/O request effective for the primary logical volume ID (5A) in the copy pair management information 1230a (NO at Step 5020), then the write data management information 1220a is generated by using the information (write destination logical volume ID, write address and write data length) acquired at Step 5000, a storage destination address (write data pointer) of the cache memory storing the write data at Step 5010, and the sequential number representative of the number of times generating the write data management information 1220a since the remote copy start. If the transfer necessary bit is set to "necessary" at Step 5030, this transfer necessary bit is also stored in the write data management information (Step 5040).

Lastly, the data receiving unit 1110a reports a write completion to the primary host computer 100 (Step 5050).

As described above, a write process to a physical disk and a transfer process to another storage controller, which are said that a long time is generally required, are not included in the processes of the storage controller 1000 from the I/O request reception at the storage controller 1000 to the write completion report to the host. These processes are executed asynchronously by using proper timings. It is therefore possible to complete the I/O request from the primary host computer in a short time.

Figure 11A:
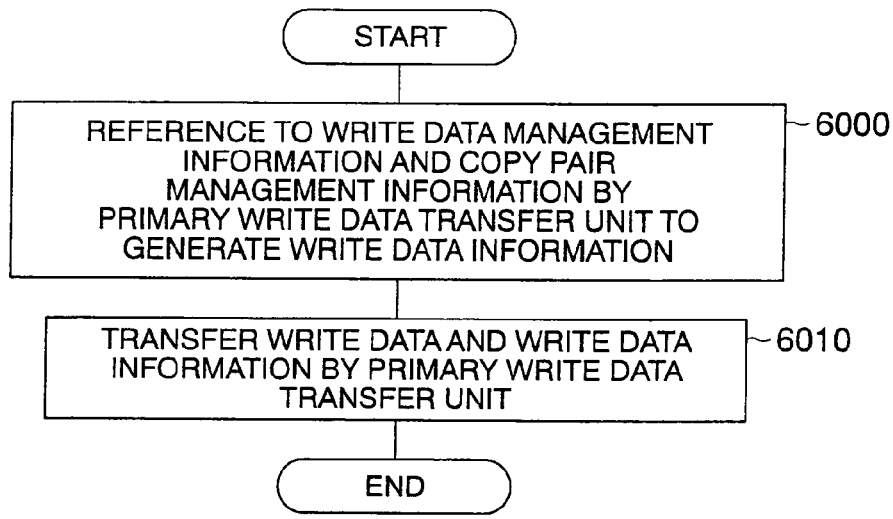
FIG. 11A is a flow chart illustrating an example of the process to be executed by a primary write data transfer unit of the primary storage controller according to the embodiment.
Figure 11B:
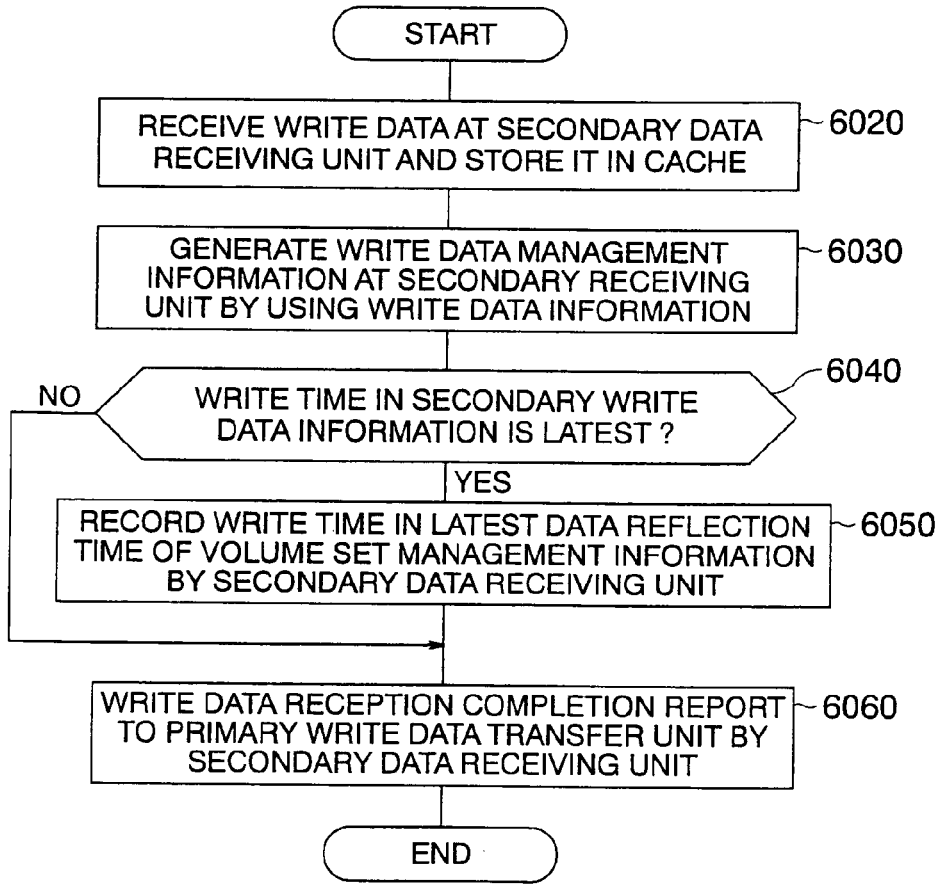
FIG. 11B is a flow chart illustrating an example of the process to be executed by secondary data receiving unit of the secondary storage controller for data received from the primary storage controller.

FIGS. 11A and 11B are flow charts illustrating an example of the transfer process of write data from the primary storage controller 1000a to the secondary storage controller 1000b.

FIG. 11A illustrates a process to be executed by the primary write data transfer unit 1120a of the primary storage controller 1000a. The primary write data transfer unit 1120a refers to the write data management information 1220a to acquire write data whose transfer necessary bit indicates "necessary" transfer, and refers to the write data management information 1220a and copy pair management information 1230a to generate write data information (Step 6000).

The write data information includes the write address, write data length and write time acquired by referring to the write data management information 1220a, and the secondary storage controller ID and secondary logical volume ID collected from the copy pair management information 1230A.

Next, the primary write data transfer unit 1120a transfers the write data acquired at Step 6000 and the write data information read from the shared memory 1200 at Step 6000, to the secondary storage controller 1000b (Step 6010).

FIG. 11B is a flow chart illustrating a process regarding the data received by the secondary data receiving unit 1110b of the secondary storage controller 1000b from the primary storage controller 1000a. The secondary data receiving unit 1110b of the secondary storage controller stores the received write data and the write data information in the cache memory (Step 6020). The secondary data receiving unit 1110b generates the write data management information 1220b from the write data information (Step 6030).

The secondary data receiving unit 1110b confirms whether the write time contained in the received write data information is latest (Step 6040), and if latest, records this write time in the latest data reflection time (2H) of the volume set management information 1210b (Step 6050).

Lastly, the secondary data receiving unit 1110b reports a write data reception completion to the primary write data transfer unit 1120a (Step 6060). Upon reception of the write data reception completion report, the write data transfer unit 1120a changes the transfer necessary bit of the write data management information 1220a to an "unnecessary" bit for the write data corresponding to the completion report. The write data can be discarded from the cache memory under the condition that the write data has been written in the copy source logical volume 1500 of the primary storage controller 1000a.

Figure 19:
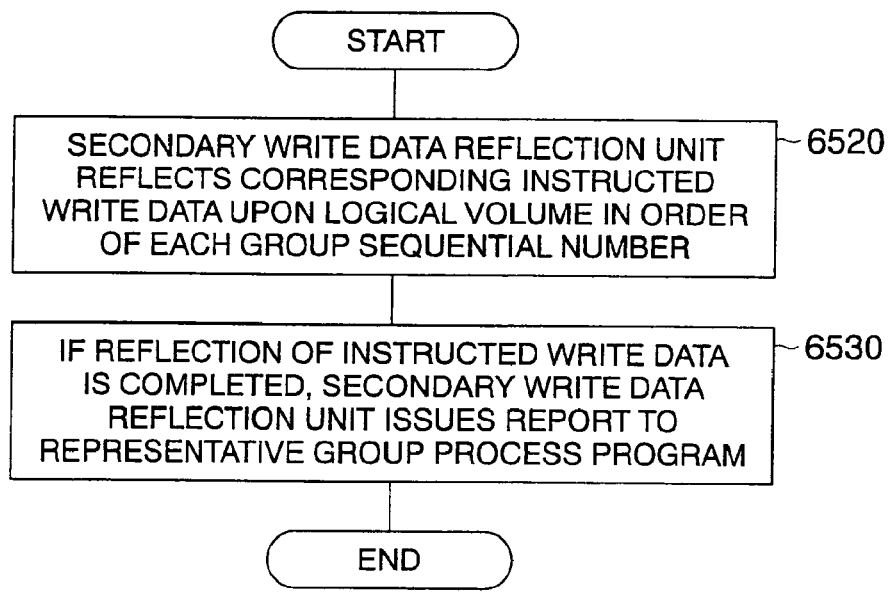
FIG. 19 is a flow chart illustrating an example of a reflection process of write data upon a copy destination logical volume in the secondary storage controller not operating the representative group process program according to the embodiment.

FIGS. 12 and 19 are flow charts illustrating an example of a reflection process for write data upon the copy destination logical volume of the secondary storage controller 1000b.

FIG. 12 is a flow chart illustrating a process to be executed by the secondary storage controller 1000b having the representative group process program 1140b.

The representative group process program 1140b possessed by one of a plurality of secondary storage controllers 1000b acquires the latest data reflection times of all groups recorded in the volume set management information 1210b from all the secondary storage controllers 1000b. Next, the oldest time among the acquired latest data reflection times is obtained and stored in the container time (1C) of the copy group management information (Step 6500). The representative group process program 1140b instructs all the secondary storage controllers 1000b to reflect write data corresponding to the write data management information 1220b having a time older than the container time obtained at Step 6500, upon the copy destination logical volume (Step 6510).

The representative group process program 1140b confirms whether the secondary storage controller 1000b as the copy group object reports the reflection process upon the copy destination logical volume. The representative group process program 1140b confirms the report of the reflection process (Steps 6540, 6550), and if it is confirmed that write data of all object secondary storage controllers is reflected completely (YES at Step 6550), the process is terminated (Step 6550).

FIG. 19 is a flow chart illustrating a process to be executed by the secondary storage controller 1000b not having the representative group process program 1140b.

The secondary write data reflection unit 1150b writes the write data corresponding to the instruction issued at Step 6510 to the copy destination logical volume 1500 in the I/O request issue order of each group. If the instructed write data is written in the logical volume, the secondary write data reflection unit reports a reflection completion to the representative group process program 1140b (Step 6540).

The process to be executed by the secondary write data reflection unit 1110b of each secondary storage controller has been described above. In the secondary storage controller having the representative group process program, the secondary write data reflection unit 1110b operates with the representative group process program. In the secondary storage controller not having the representative group process program, the secondary write data reflection unit 1110b communicates with the representative group process program via the communication link 500.

FIG. 16 shows an example of remote copy configuration information 121 to be used by the storage management software 120/220 of the primary/secondary host computers 130a/b, the remote copy configuration information being stored in the memory of the host computer. The remote copy configuration information is used for managing the configuration of remote copy and the statuses of the copy group and copy pair. The remote copy configuration information is constituted of a copy group ID (9A), a representative storage controller ID (9B), a write data integrity guarantee (9C), a primary volume set ID (9D), a secondary volume set ID (9E), a primary storage controller ID (9F), a secondary storage controller ID (9G), a primary logical volume ID (9H), a secondary logical volume ID (9I) and a pair status (9J). The copy group ID is an ID for identifying a copy group, the representative storage controller ID is an ID for identifying the secondary storage controller 1000b having the representative group process program 1140b, and the write data integrity guarantee indicate whether the copy group can guarantee write data integrity. The primary volume set ID is a volume set ID of the primary storage controller, and the secondary volume set ID is a volume set ID of the secondary storage controller. The primary logical volume ID is an ID for identifying the primary logical volume of the primary storage controller, and the secondary logical volume ID is an ID for identifying the secondary logical volume of the secondary storage controller. The pair status stores the status of the copy pair.

FIG. 15 shows an example of a storage control instruction 7300. The storage control instruction is one type of the I/O request to be issued from the primary host computer 100 to the storage controller 1000. The storage control instruction includes a destination (8A), an instruction content (8B), a copy group ID (8C), a volume set ID (8D) and an option (8E). The destination (8A) stores the issue source (ID for identifying the storage controller 1000 and logical volume) of the I/O request issued by the host computer 1000. The instruction content (8B) designates the instruction content of storage control. The instruction content includes a copy group operation (copy group registration, copy group deletion, group addition to copy group, group deletion from copy group), a copy group copy operation (copy temporary stop, copy resume, copy release), a representative group process program operation (representative group registration, release, status report), a group copy operation (copy temporary stop, copy resume, copy release), and a copy pair operation (copy start, copy temporary stop, copy resume, copy release, copy status acquisition). The copy group ID (8C) stores an ID for identifying a copy group. The volume set ID stores an ID for identifying a group. The option (8E) designates option information for helping the storage control instruction.

Next, with reference to FIG. 13, description will be made on a copy start operation to be executed by the host computer by using a copy group.

First, a user or the like managing a remote copy generates the remote copy configuration information 121 by using the storage management software 120 of the primary host computer 100 (Step 5320). Next, the primary host computer 100 generates a storage control instruction 7300 for starting the remote copy, from the generated remote copy configuration information (Step 5330). The content of the storage control instruction is a copy pair operation (start). Next, the generated storage control instruction command is issued to the primary storage controller for control of the remote copy (Step 5340). Next, in order to allow integrity retention of write data among a plurality of storage controllers, the primary host computer 100 generates a storage control instruction (instruction content is a representative group process program operation (group addition to the copy group)) for coupling a plurality of remote copies to the copy group (Step 5350). Group information (primary/secondary volume set ID, primary/secondary storage controller IDs) of all groups of the copy group to be controlled is written in the storage control instruction. Lastly, the primary host computer issues the generated storage control instruction to the secondary storage controller 1000b having the representative group process program (Step 5360). If the communication link is not connected directly to the secondary storage controller, the storage control instruction may be issued to the secondary storage controller via the primary storage controller connected to the communication link 500.

Next, with reference to FIGS. 10A, 10B and 14, description will be made on a remote copy operation at the copy start to be executed by the storage controller using a copy group.

Figure 10A:
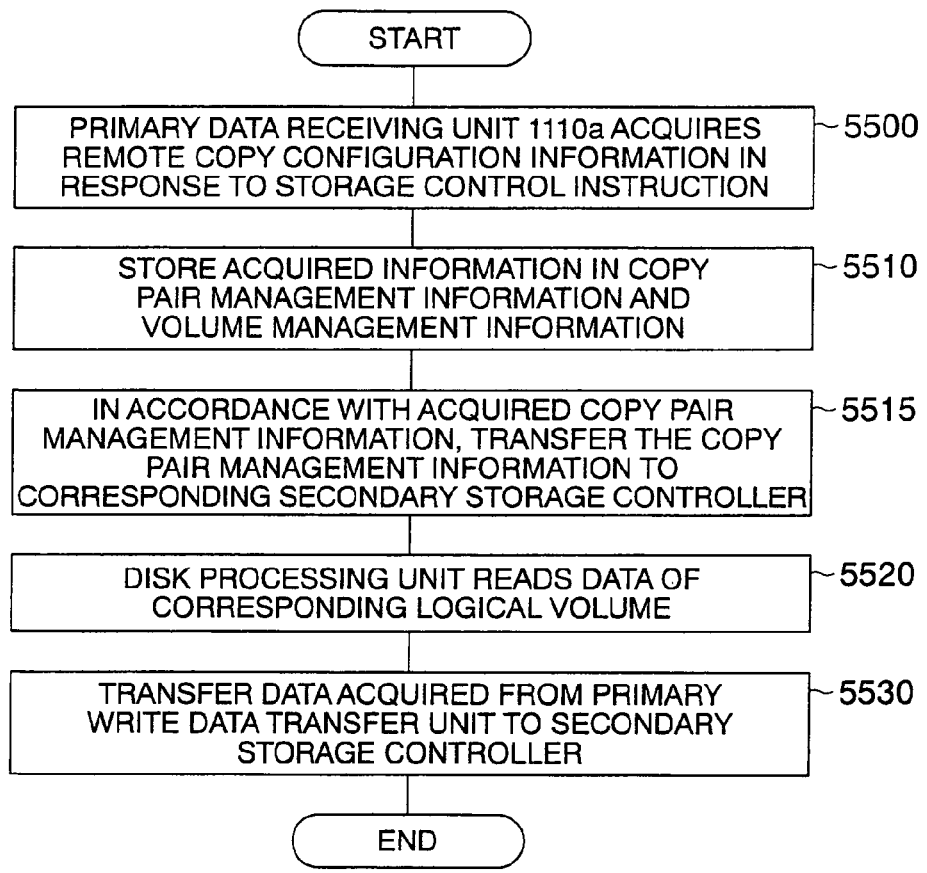
FIG. 10A is a flow chart illustrating an example of a process to be executed immediately after a primary storage controller 1000*a* starts remote copy.

FIG. 10A is a flow chart illustrating an example of the process to be executed by the primary storage controller 1000a immediately after the remote copy start.

When the I/O controller 1100a of the primary storage controller 1000a is instructed by the storage control instruction to perform a copy pair operation (copy start), the I/O controller extracts the remote copy configuration information stored in the option ((8E)) of the storage control instruction 7300 (Step 5500). The copy configuration information includes a primary storage controller ID, a copy source logical volume ID, a secondary storage controller ID, a copy destination logical volume ID, a copy type, a primary volume ID and a secondary volume ID. The primary data receiving unit 1110a registers the copy configuration information in the copy pair management information 1230a and volume management information 1240a. The primary data receiving unit sets the content of the copy status (5B) of the copy pair management information 1230a to a coping status, and sets the volume status (6B) of the volume management information 1240a to a primary status.

Next, the primary receiving unit transfers the acquired remote copy configuration information as special data to the secondary storage controller 1000b via the primary write data transfer unit 1120a, in accordance with the acquired information (Step 5515).

Next, the primary data receiving unit instructs the disk processing unit 1400a to start an initial copy (Step 5520). In accordance with the instruction, the disk processing unit 1400a reads data corresponding to a remote copy from the disk apparatus 1600a, writes the read data to the cache memory, and notifies partial data read to the primary data receiving unit. The primary data receiving unit reads the data from the cache memory, generates the write data management information 1240b, and transfers the write data management information 1240b to the secondary storage controller 1000b (Step 5530). The primary data receiving unit repeats Steps 5520 and 5530 until all the contents of the copy source logical volume are transferred to the secondary storage controller. When transfer to the secondary storage controller is completed, the data receiving unit 1110a sets the contents of the copy status (5B) of the copy pair management information 1230a to the duplex status. The primary data receiving unit notifies the secondary storage controller of a termination of a copying status.

Figure 10B:
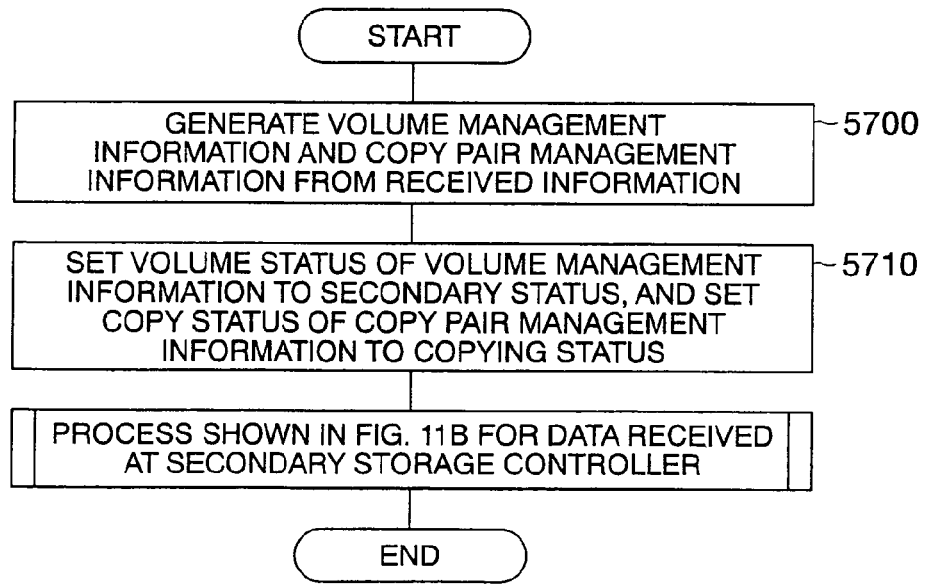
FIG. 10B is a flow chart illustrating an example of a process to be executed by a secondary storage controller 1000*b* immediately after the remote copy start.

FIG. 10B is a flow chart illustrating an example of the process to be executed by the secondary storage controller 1000b immediately after the remote copy start. In accordance with the remote copy configuration information transferred at Step 5515, the secondary data receiving unit 1110b of the secondary storage controller 1000b generates the volume management information 1240b and copy pair management information 1230b (Step 5700). The volume status of the volume management information 1240b is set to a secondary status, and the copy status of the copy pair management information 1230b is set to the copying status (Step 5710). The secondary storage controller 1000b executes the process shown in FIG. 11B for the data of the remote copy transferred from the primary storage controller at Step 5530. When the transfer completion is notified to the secondary storage controller, the data receiving unit 1110b sets the content of the copy status (5B) of the copy pair management information 1230b to the duplex status to thereafter continue the process.

Figure 14:
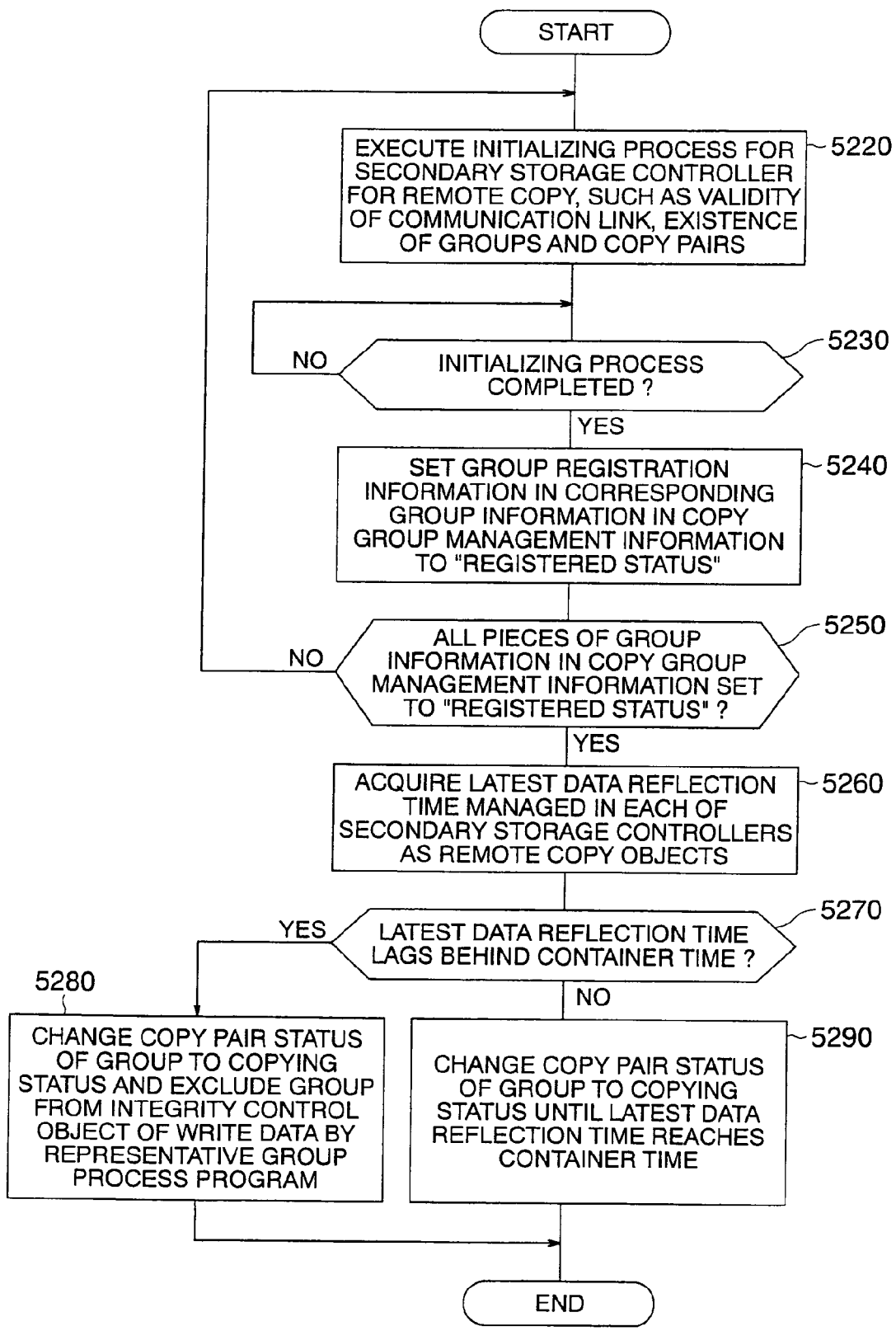
FIG. 14 is a flow chart illustrating an example of a process to be executed by the representative group process program according to the embodiment, the process being executed for allowing to guarantee write data integrity among a plurality of storage controllers for remote copies independently operated in storage controllers.

FIG. 14 is a flow chart illustrating an example of the process to be executed by the representative group process program 1140b, the process being executed in order to guarantee integrity of write data among a plurality of storage controllers for remote copies independently performed at respective storage controllers. This process is executed when the primary storage controller receives the representative group process program operation (group addition to the copy group) by the host computer, and may be executed in parallel to the processes shown in FIGS. 10A and 10B.

Upon reception of an instruction (group addition to the copy group) to the representative group process program from the primary host computer, the representative group process program 1140a run on one of the secondary storage controllers 1000b executes first an initializing process including checking validity of the communication link 530 from the secondary storage controller running the representative group process program to the object secondary storage controller, checking existence of groups in each secondary storage controller and checking existence of copy pairs (Step 5220). After reception of the initializing process, the secondary storage controller starts the processes shown in FIG. 19 at the time of completion of initializing process in accordance with the instruction of the representative group process program. When the initializing process is completed (YES at Step 5230), the representative group process program sets the group registration information in the corresponding group information (1D) of the copy group management information 1250b to the registered status (Step 5240). The process from Step 5220 to Step 5250 is repeated until all pieces of group registration information registered in the copy group management information are set to the "registered status".

If all pieces of group registration information registered in the copy group management information are set to the "registered status" (YES at Step 5250), the representative group process program 1140b acquires the latest data reflection time managed by the volume set management information 1210b for each of the secondary storage controllers as the remote copy objects (Step 5260). The representative group process program 1140b compares the acquired latest data reflection time with the container time stored in the copy group management information, and if the latest data reflection time lags behind the container time (YES at Step 5270), the copy pair status of the group is changed to the copying status and the group is excluded from the integrity control object of write data by the representative group process program, until the latest data reflection time reaches the container time (Step 5280). If the latest data reflection time advances from the container time (NO at Step 5270), the copy pair status of the group is changed to the copying status until the container time reaches the latest data reflection time (Step 5290). This group is included in the integrity control object of write data by the representative group process program.

As described above, in order to guarantee integrity of write data among a plurality of storage controllers for remote copies independently performed at respective storage controllers, if there is a shift between the latest data reflection time of a group newly added to the copy group and the container time, the copy status of the group to be newly added is changed to the copying status, so that non-integrity of write data can be notified to the storage management software.

Figure 8:
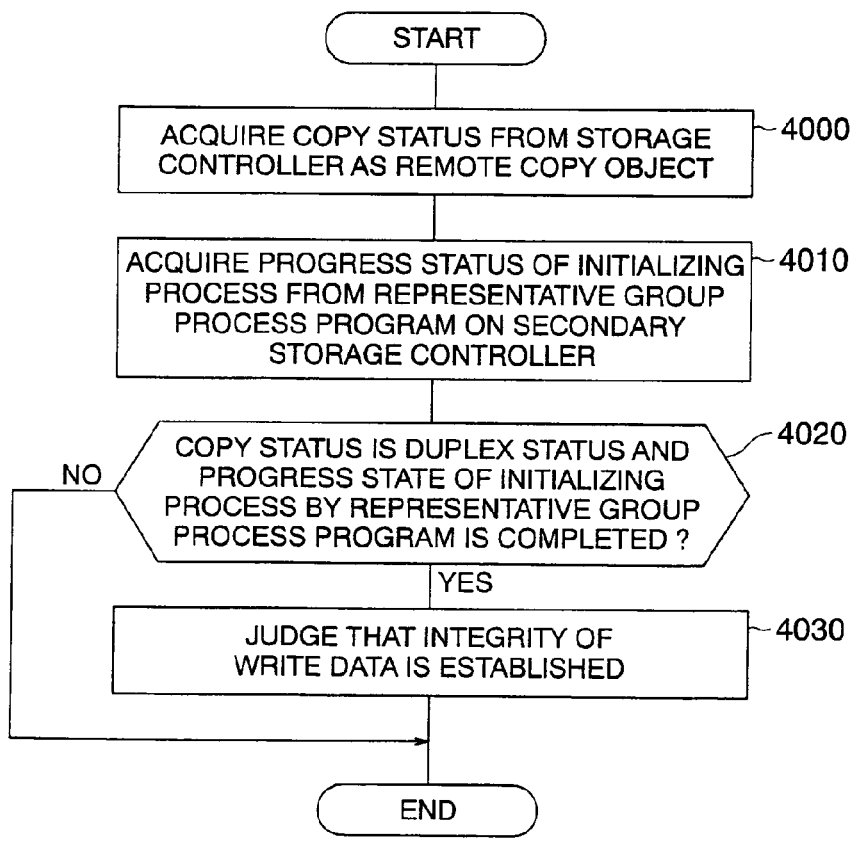
FIG. 8 is a flow chart illustrating an example of a process of judging write data integrity of remote copy to be executed by a host computer according to the embodiment.

With reference to FIG. 8, description will be made on a method of judging whether write data integrity is established in remote copy control by the host computer using a copy group.

In response to an instruction from the storage management software 120, the host computer 100 refers to the remote copy configuration information 121, and generates a storage control instruction (instruction content is a copy pair operation (copy status acquisition)) in order to acquire the copy status of the storage controller as a remote copy object. Next, the host computer issues the storage control instruction to the corresponding storage controller and acquires the copy status (Step 4000).

Next, the host computer generates a storage control instruction (instruction content is a representative group process program operation (status report)) to acquire a progress status of the initializing process at Step 5220 by the representative group process program. Next, the host computer issues the storage control instruction to a corresponding secondary storage controller and acquires the progress status of the initializing process by the representative group process program (Step 4010).

If the copy status is the duplex status and the progress status of the initializing process by the representative group process program is completed (the initializing process for all object groups is already registered (YES at Step 4020), then it is judged that integrity of write data is established (Step 4030). If it is judged that write data integrity is established once, the host computer guarantees write data integrity unless an error status occurs.

The host computer may judge the status that write data integrity is not established, as the copying status of the copy status. The copying status is the status that write data integrity cannot be guaranteed. It is therefore necessary to ensure compatibility in order to eliminate a difference between the remote copy of the embodiment and a remote copy of another type. This is advantageous in that when the remote copy of the embodiment is applied, for example, to application software for remote copy control, it is not necessary to modify the remote copy of the embodiment.

As described so far, according to the embodiment, in the remote copy to be executed traversing a plurality of storage controllers, it becomes possible to judge whether a data write sequence can be guaranteed, only when satisfying both completion of the initializing process by the representative group process program for guaranteeing the write sequence of data copied among a plurality of storage controllers and transition to the duplex status of the remote copy status. As the representative group process program issues a coupling instruction, a plurality of remote copies to be executed among a plurality of storage controllers, can be coupled to one remote copy. By using the judging method of judging whether the data write sequence can be guaranteed, the data write sequence can be guaranteed for remote copy users.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A computer system comprising:
   a first computer;
   a second computer;
   a plurality of primary storage systems coupled to the first computer and the second computer, and each primary storage system including a logical volume for storing data received from the first computer; and
   a plurality of secondary storage systems coupled to the first computer and the second computer, and each secondary storage system including a logical volume for storing replication data of a logical volume of a primary storage system,
   wherein the second computer manages copy pairs of a part of the logical volumes of the primary storage systems and a part of the logical volumes of the secondary storage systems, and transmits a group control instruction to the secondary storage systems for controlling a replication process by using the copy pairs as a copy group,
   wherein each primary storage system receives write data from the first computer, and the primary storage system transmits the write data to a secondary storage system, the second computer acquires a copy status from the secondary storage system, and the secondary storage system executes an initializing process, and
   wherein, if the copy status is a duplex status in which logical contents are coincident, a latest data reflection time managed by volume set management information for the secondary storage system and a container time of the copy group are coincident, and the initializing process is completed, then the second computer judges that integrity of the write data is established.

2. The computer system according to claim 1, wherein if it is judged that the write data integrity is established once, the second computer guarantees the write data integrity unless an error status occurs.

3. The computer system according to claim 1, wherein the second computer generates a storage control instruction, issues the storage control instruction to the secondary storage system, and acquires the copy status.

4. The computer system according to claim 1, wherein the second computer generates a storage control instruction, issues the storage control instruction to the secondary storage system, and acquires a progress status of the initializing process.

5. The computer system according to claim 1, wherein the second computer judges a status that the write data integrity is not established as a copying status.

6. A method for judging a copy status in a computer system including a first computer, a second computer, a plurality of primary storage systems coupled to the first computer and the second computer, and each primary storage system including a logical volume for storing data received from the first computer, and a plurality of secondary storage systems coupled to the first computer and the second computer, and each secondary storage system including a logical volume for storing replication data of a logical volume of a primary storage system, the method comprising:
   managing, by the second computer, copy pairs of a part of the logical volumes of the primary storage systems and a part of the logical volumes of the secondary storage systems;
   transmitting, by the second computer, a group control instruction to the secondary storage systems for controlling a replication process by using the copy pairs as a copy group;
   receiving, by the primary storage system, write data from the first computer and transmitting the write data to the secondary storage system;
   acquiring, by the second computer, a copy status from the secondary storage system, the secondary storage system executing an initializing process; and
   judging, by the second computer, that integrity of the write data is established, if the copy status is a duplex status in which logical contents are coincident, a latest data reflection time managed by volume set management information for the secondary storage system and a container time of the copy group are coincident, and the initializing process is completed.

7. The method for judging a copy status according to claim 6, further comprising a step of:
   guaranteeing, by the second computer, the write data integrity if it is judged that the write data integrity is established once unless an error status occurs.

8. The method for judging a copy status according to claim 6, further comprising steps of:
   generating, by the second computer, a storage control instruction, issuing the storage control instruction to the secondary storage system; and
   acquiring the copy status.

9. The method for judging a copy status according to claim 6, further comprising steps of:
generating, by the second computer, a storage control instruction;
issuing the storage control instruction to the secondary storage system; and
acquiring a progress status of the initializing process.

10. The method for judging a copy status according to claim 6, further comprising a step of:
judging, by the second computer, a status that the write data integrity is not established as a copying status.

* * * * *